3,445,208
METHOD OF STRENGTHENING GLASS BY A POTASSIUM-NITRATE-POTASSIUM BOROFLUORIDE MELT
Neil Hunter Ray, Northwich, England, assignor to Imperial Chemical Industries Limited, London, England, a corporation of Great Britain
No Drawing. Filed Feb. 3, 1965, Ser. No. 430,162
Claims priority, application Great Britain, Feb. 24, 1964, 7,573/64
Int. Cl. C03c 17/00, 15/00; C03b 27/00
U.S. Cl. 65—30    3 Claims This invention relates to a treatment for glass and particularly to a process by which glass can be toughened and given an increased strength at the same time.

The process of heating glass to a temperature just short of its softening point and then cooling it rapidly, either with a current of air or by immersing it in a liquid bath, is known as tempering or toughening and produces glass possessing increased strength and also the property of fracturing into small pieces with the minimum of sharp edges. This type of glass is often described as toughened glass, and because of its characteristic mode of fracture it is used for windscreens of motor vehicles since in the event of an accident causing fracture of the glass the resulting fragments cause less injury than would the piece of a broken sheet of untreated glass.

In U.S. application S.N. 365,776, filed May 7, 1964, now Patent No. 3,317,297, I have described a process for strengthening glass by treatment in molten salt baths, for example a bath containing a mixture of potassium nitrate, potassium borofluoride and silver nitrate. Glass treated in this mixture at for example 350°–450° C. for 10 minutes is four to five times stronger than untreated glass, but its mode of fracture is unchanged; for this reason glass so strengthened is not suitable for the many uses for which toughened glass is preferred.

I have now found a method by which the desirable fracture characteristics of toughened glass can be given to glass whilst it is undergoing strengthening by the process of U.S. application S.N. 365,776.

According to my invention I provide a process for toughening and strengthening glass comprising heating the glass until it is throughout its thickness at a temperature just below its softening point, and then rapidly cooling it from this temperature in a melt at a temperature below the lower annealing temperature of the glass, said melt comprising at least one etching agent, as hereinafter defined, dissolved in a molten salt whose cations at the temperature of the melt replace a proportion of the cations in the surface of the glass and thereafter occupy a larger volume in the glass than said cations in the surface.

An etching agent is defined for purposes of the invention as a substance that can remove a thin uniform layer from the glass under the conditions of the process and not give rise to hydrogen ions or other ions having a greater affinity for the glass than the cations of the molten salt in which the agent is dissolved. Examples of etching agents are sodium and potassium borofluorides, sodium and potassium fluorides, ammonium fluorophosphate, silver fluoride, of which the borofluorides of sodium and potassium are particularly effective. The proportion of etching agent in the melt is generally from 20% to 60% by weight.

A suitable molten salt in which to dissolve the etching agent is molten potassium nitrate. Other substances that act as catalysts or modifiers can, if desired, with advantage be included in the melt, for example metallic silver, silver salts that are soluble in molten potassium nitrate at temperatures below 500° C. and monovalent thallium salts that are similarly soluble.

A suitable proportion of catalyst or modifier is from 2% to 5% by weight of the melt. The temperature of the melt, the proportions of the constituents in it and the time over which the glass is in contact with it are interrelated and admit of individual variation. The preferred salt whose cations are to replace cations in the surface of the glass is potassium nitrate, and the preferred etching agents are potassium and sodium borofluorides and if these are used without a modifier a particularly effective combination is 60% to 70% of potassium nitrate and 30% to 40% of potassium borofluoride. If the preferred catalyst or modifier, silver nitrate, is present a particularly effective combination is 58% to 60% potassium nitrate, 38% to 40% potassium borofluoride and 2% to 4% silver nitrate, all percentages being by weight. The useful range of melts can be described as comprising combinations of potassium nitrate, potassium borofluoride or sodium borofluoride, and silver nitrate containing 20% to 60% by weight of the borofluoride and 0% to 5% by weight of silver nitrate.

The process can be carried out in one stage as already described, and as illustrated in Example 1 and in Example 2, or in two stages as illustrated in Example 3. Example 1 discloses a melt containing silver nitrate as modifier whilst Example 2 discloses a melt containing no modifier.

In a convenient way of carrying out the one-stage process the glass, after being heated throughout to a temperature just below its softening point, is rapidly transferred to the melt, which is preferably agitated to improve heat-transfer, and kept there at a temperature usually within the range 400°–500° C. and below the lower annealing temperature of the glass for from 2 to 15 minutes. After this the glass is removed, allowed to drain and cooled to ambient temperature. Any adhering materials from the melt are then removed by washing in water. Glass treated in this way is found to have fracture characteristics typical of toughened glass and a tensile strength of the order of 60,000 lbs./sq. inch.

A convenient way of carrying out the two-stage process is to heat the glass throughout to a temperature just below its softening point and then to transfer it rapidly into a melt containing no modifier and maintained at a temperature below the lower annealing temperature of the glass and to keep the glass immersed therein for five to ten minutes. After this the glass is quickly transferred without draining into a second melt at the same temperature and having the same or approximately the same composition as the first but with added modifier, preferably silver nitrate. The glass is kept for a shorter time in the second melt, for example 3 to 6 minutes and thereafter withdrawn, cooled, rinsed with water and dried.

EXAMPLE 1

A six-inch square sheet of plate glass ¼ inch thick was heated in a furnace at 700° C. during 20 minutes and then lowered rapidly into a molten salt bath containing by weight 39% potassium borofluoride, 59% potassium nitrate, and 2% silver nitrate, held at a temperature of 410° C. The plate was agitated in this bath for 10 minutes and then removed, cooled to room temperature during 30 minutes, and then washed with warm water until all adhering salts were removed.

A steel ball weighing 225 g. was dropped on the center of the plate which was supported by its edges only, commencing with a drop of 18 inches and increasing the height of fall by 6 inches at each trial until the plate broke. The plate withstood a drop of 8 feet and broke at 8 ft. 6 in. Under similar test, an untreated glass plate of the same batch of glass broke with a fall of 2 feet, and a sample of a proprietary brand of commercially available toughened glass of the same thickness broke at 4 ft. 6 in. When the plate treated as described above was broken the fragments of glass were nearly rectangular in shape, free from sharp edges, and averaged one-thirty-second of a cubic inch in volume. This is similar to the behaviour of the commercially available toughened glass, but the shattered plate retained greater transparency than did samples of the latter.

EXAMPLE 2

Sheets of plate glass ¼ inch in thickness were heated in a furnace maintained at a temperature designated as T° C. for 4 minutes, and then transferred as rapidly as possible into a molten salt mixture consisting of 60% by weight of potassium nitrate and 40% by weight of potassium borofluoride maintained at 410° C. The sheets were agitated in this mixture for 10 minutes, then withdrawn, cooled, washed with water and dried. Their impact strength was determined by measuring the height from which a 225 g. steel ball, dropped on to the center of a six-inch square of glass supported by the edges, would just cause it to break.

Untreated plate glass broke with a drop of 2′0″ and ordinary toughened glass broke at 4′6″ in this test. The chemically-tempered sheets gave the following results:

| T° C.: | Height |
|---|---|
| 730 | 5′6″ |
| 745 | 6′0″ |
| 760 | 6′0″ |
| 790 (20 specimens) | 6′0″–6′6″ |

The small pieces produced on fracture were free from sharp edges and points.

EXAMPLE 3

Sheets of ¼-inch plate glass were heated in a furnace at 790° C. for 4 minutes and then transferred as rapidly as possible into a molten salt mixture consisting of 60% by weight of potassium nitrate and 40% by weight of potassium borofluoride at 410° C. The sheets were agitated for 10 minutes in this mixture and then transferred without draining into a second molten salt bath at the same temperature containing 59% by weight of potassium nitrate, 39% by weight of potassium borofluoride, and 2% by weight of silver nitrate. After 3 minutes in this second bath the sheets were withdrawn, cooled, rinsed with water, and dried. Their impact strength was measured in the same way as described above using a 225 g. steel ball. The height from which the ball had to be dropped to break a six-inch square of glass supported by its edges was found to be between 6′6″ and 7′0″ (20 specimens), and on fracture the glass broke into small pieces free from sharp edges and points.

What I claim is:

1. A process for toughening and strengthening glass comprising heating the glass until it is throughout its thickness at a temperature just below its softening point and then rapidly cooling it from this temperature by immersing in a melt at a temperature from 400° C. to 500° C. and below the lower annealing temperature of the glass and then cooling the glass in the melt for from 2 to 15 minutes, said melt comprising 60 to 70 percent potassium nitrate and 30 to 40 percent potassium borofluoride by weight.

2. A process for toughening and strengthening glass comprising heating the glass until it is throughout its thickness at a temperature just below its softening point and then rapidly cooling it from this temperature by immersing in a melt at a temperature from 400° C. to 500° C. and below the lower annealing temperature of the glass and then cooling the glass in the melt for from 2 to 15 minutes, said melt comprising 58 to 60 percent potassium nitrate, 38 to 40 percent potassium borofluoride and 2 to 4 percent silver nitrate by weight.

3. A process for toughening and strengthening glass comprising heating the glass until it is throughout its thickness at a temperature just below its softening point, and then rapidly cooling the glass from this temperature by immersing successively in two separate melts having the same temperature, the first melt comprising 60 to 70 percent potassium nitrate and 30 to 40 percent potassium borofluoride by weight and the second melt comprising 58 to 60 percent potassium nitrate, 38 to 40 percent potassium borofluoride and 2 to 4 percent silver nitrate by weight, the temperature of each melt being from 400° C. to 500° C. and below the lower annealing temperature of the glass, the glass being cooled in the first melt for 5 to 10 minutes and then being cooled in the second melt for 3 to 6 minutes.

References Cited

UNITED STATES PATENTS

| 2,143,796 | 1/1939 | Phillips | 65—116 |
| 2,145,119 | 1/1939 | Littleton | 65—116 |
| 2,145,128 | 1/1939 | Phillips | 65—116 |
| 3,287,200 | 11/1966 | Hess et al. | 65—30 |
| 3,317,297 | 5/1967 | Ray | 65—30 |

DONALL H. SYLVESTER, *Primary Examiner.*

R. L. LINDSAY, JR., *Assistant Examiner.*

U.S. Cl. X.R.

65—31, 116